United States Patent
Yu et al.

(10) Patent No.: US 12,107,423 B2
(45) Date of Patent: Oct. 1, 2024

(54) SYSTEM AND METHOD FOR SELECTING A VOLTAGE ON A BARREL ADAPTER INTERFACE

(71) Applicant: Dell Products L.P., Round Rock, TX (US)

(72) Inventors: Wei-Cheng Yu, New Taipei (TW); Merle Jackson Wood, Round Rock, TX (US); Tsung-Cheng Liao, Taoyuan (TW); Chin-Jui Liu, Taoyuan (TW); Andrew Thomas Sultenfuss, Leander, TX (US); Chi Che Wu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 17/661,113

(22) Filed: Apr. 28, 2022

(65) Prior Publication Data
US 2023/0352941 A1 Nov. 2, 2023

(51) Int. Cl.
*G06F 1/18* (2006.01)
*G06F 1/26* (2006.01)
*H02J 3/18* (2006.01)

(52) U.S. Cl.
CPC ............ *H02J 3/18* (2013.01); *G06F 1/188* (2013.01); *G06F 1/26* (2013.01)

(58) Field of Classification Search
CPC ... G06F 1/188; G06F 1/26; G06F 1/28; G06F 1/32; G06F 1/3203; G06F 1/3296; H02J 3/18
See application file for complete search history.

(56) References Cited

U.S. PATENT DOCUMENTS

| | | | | |
|---|---|---|---|---|
| 10,444,815 | B1* | 10/2019 | Sultenfuss | G06F 1/3296 |
| 2003/0159073 | A1* | 8/2003 | Breen | H02J 7/04 713/300 |
| 2006/0082960 | A1* | 4/2006 | Breen | G06F 1/263 361/679.01 |
| 2006/0220465 | A1* | 10/2006 | Kingsmore | G06F 1/26 307/64 |
| 2010/0100752 | A1* | 4/2010 | Chueh | G06F 1/3296 713/320 |
| 2015/0370299 | A1* | 12/2015 | Waters | G06F 13/364 713/310 |
| 2017/0293347 | A1* | 10/2017 | Wood, III | G06F 1/26 |
| 2018/0373289 | A1* | 12/2018 | Sultenfuss | H02J 7/0029 |
| 2018/0375358 | A1* | 12/2018 | Sultenfuss | H02J 7/0068 |
| 2019/0074708 | A1* | 3/2019 | Krishnakumar | H02J 7/0013 |

* cited by examiner

*Primary Examiner* — Levi Gannon
(74) *Attorney, Agent, or Firm* — McDermott Will & Emery LLP

(57) ABSTRACT

A method and system for supplying power at a voltage selected from a plurality of voltages. Power is initially received at a first voltage. Embodiments communicate with an AC adapter to get device identification and see if the AC adapter supports other voltages. If so, embodiments communicate with the AC adapter to get more information about the adapter and identify what voltages the adapter is capable of providing. If one of the voltages would allow an information handling system to operate more efficiently, embodiments negotiate a power supply contract to operate at a second voltage. When the information handling system powers down, the system resets to operation at the initial voltage.

10 Claims, 5 Drawing Sheets

SYSTEM AND METHOD FOR SELECTING A VOLTAGE ON A BARREL ADAPTER INTERFACE

BACKGROUND

Field of the Disclosure

This disclosure relates generally to information handling systems and, more particularly, to a system for providing power at any of a plurality of voltages to the information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems receive power from connectors commonly referred to as barrel connectors, in which a barrel receives a pin to form an electrical connection. As processing and communication speeds increase, these connectors must be able to receive more power.

SUMMARY

Embodiments disclosed herein may be generally directed to a dock and a method for supplying power to an information handling system at a voltage selected from a plurality of voltages. The dock may start supplying power to an information handling system at a first voltage, determine the AC adapter is capable of supplying power at a second voltage of the plurality of voltages, establish a power supply contract with the AC adapter to supply the power at the second voltage of the plurality of voltages, configure the dock to operate in a device mode based on the power supply contract, and communicate with the AC adapter to supply the power at the second voltage of the plurality of voltages. In some embodiments, the second voltage is selected based on an operating efficiency of the information handling system.

In some embodiments, determining the AC adapter is capable of supplying power at a second voltage of the plurality of voltages comprises communicating with the AC adapter to get power supply identification (PS_ID) information and determining one or more voltages the AC adapter is capable of providing based on the PS_ID information.

In some embodiments, communicating with the AC adapter to get the PS_ID information is performed over a 1-wire interface using a first protocol and communicating with the AC adapter to determine one or more voltages the AC adapter is capable of providing is performed over the 1-wire interface using a second protocol. In some embodiments, the first protocol is an SDQ protocol. In some embodiments, the 1-wire interface comprises a PSID pin.

In some embodiments, an embedded controller (EC) is configured to cause a voltage drop as a signal to switch between the first protocol and the second protocol.

In some embodiments, establishing a power supply contract with the AC adapter to supply the power at the second voltage of the plurality of voltages comprises signaling the AC adapter a request for a power supply contract, signaling a request to operate in a device mode based on the second voltage and signaling a request to receive the power at the second voltage.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1A:
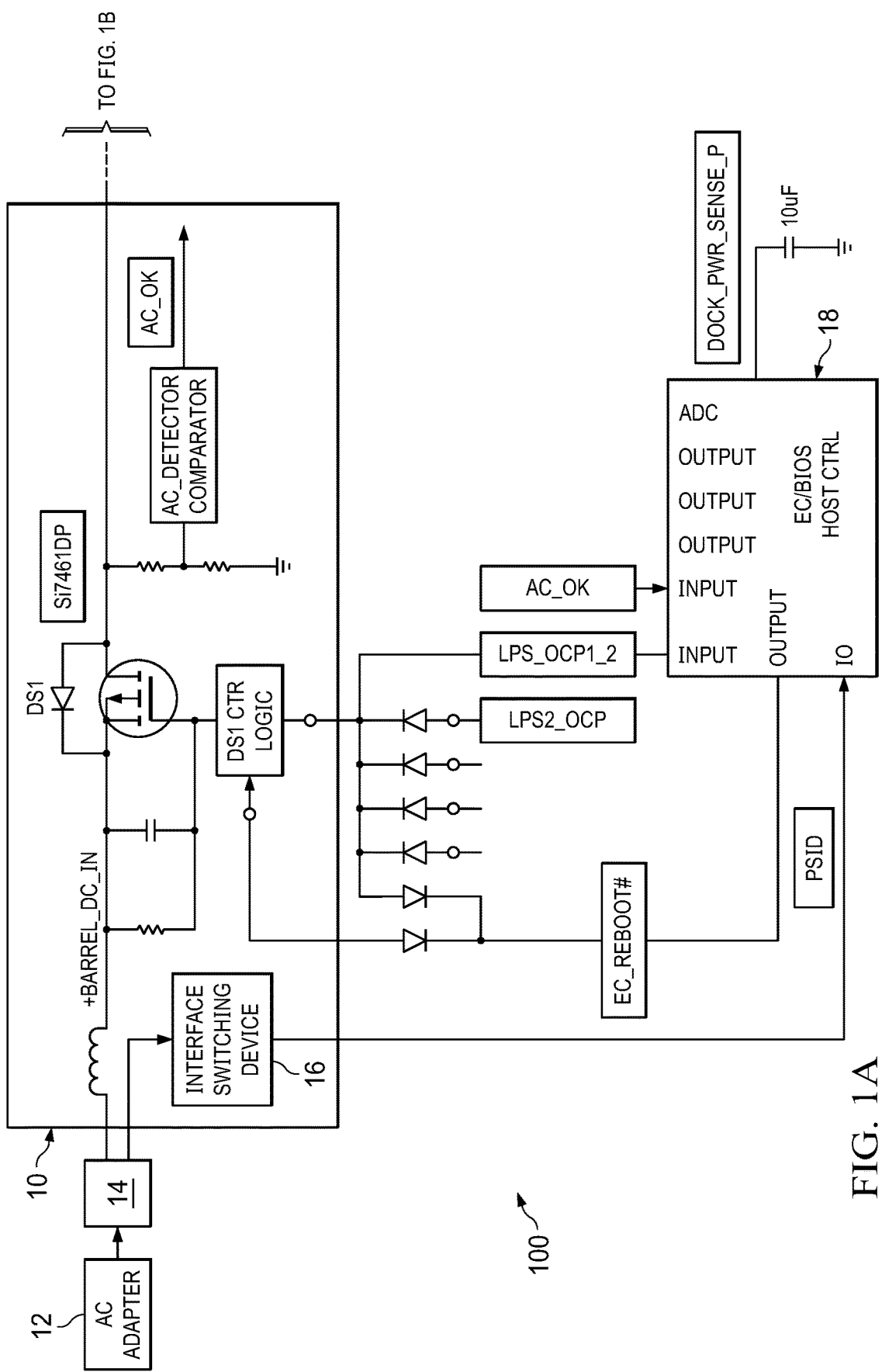
FIGS. 1A and 1B depict portions of a view of a dock capable of receiving AC power from an adapter and supplying power to an information handling system at any voltage of a plurality of voltages.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Components of an information handling system may include, but are not limited to, a processor subsystem, which may comprise one or more processors, and a system bus that communicatively couples various system components to processor subsystem including, for example, a memory subsystem, an I/O subsystem, local storage resource, and network interface.

A processor subsystem may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, a processor subsystem may interpret and execute program instructions and process data stored locally (e.g., in memory subsystem). In the same or alternative embodiments, a processor subsystem may interpret and execute program instructions and process data stored remotely (e.g., in a network storage resource).

A system bus may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

A memory subsystem may comprise a system, device, or apparatus operable to retain and retrieve program instructions and data for a period of time (e.g., computer-readable media). A memory subsystem may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system is powered down.

An I/O subsystem in an information handling system may comprise a system, device, or apparatus generally operable to receive and transmit data to or from or within an information handling system. An I/O subsystem may represent, for example, a variety of communication interfaces, graphics interfaces, video interfaces, user input interfaces, and peripheral interfaces. In various embodiments, an I/O subsystem may be used to support various peripheral devices, such as a touch panel, a display adapter, a keyboard, a touch pad, or a camera, among other examples. In some implementations, an I/O subsystem may support so-called 'plug and play' connectivity to external devices, in which the external devices may be added or removed while an information handling system is operating.

A local storage resource may comprise computer-readable media (e.g., hard disk drive, floppy disk drive, CD-ROM, and other type of rotating storage media, flash memory, EEPROM, or another type of solid-state storage media) and may be generally operable to store instructions and data.

A network interface may be a suitable system, apparatus, or device operable to serve as an interface between an information handling system and a network (not shown). A network interface may enable an information handling system to communicate over a network using a suitable transmission protocol or standard. In some embodiments, a network interface may be communicatively coupled via a network to a network storage resource (not shown). A network coupled to a network interface may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to a network interface may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to a network interface or various components associated therewith may be implemented using hardware, software, or any combination thereof.

Legacy AC Adapters Supply a Single Fixed Voltage

Legacy barrel adapters are typically a fixed voltage (ex: 19.5 Volts (V)) that is determined when power supply identification (PS_ID) information is communicated over a 1-wire interface using a basic 1-wire communication protocol on insertion of the power supply cord into a barrel-type connector. For example, in some information handling systems, communication with an AC adapter is performed over a PS_ID pin as a 1-wire interface. SDQ is a proprietary 1-wire communication protocol designed by Texas Instruments.

New AC Adapters May Supply any of Multiple Voltages

Barrel type connectors may be capable of handling more current to enable more power. However, increasing the voltage may enable much higher power usage or more efficient operation of an information handling system. Furthermore, using a larger cable may be undesirable because larger cables tend to be less flexible and can act as a lever to accidentally move the information handling system. A smaller flexible cable is a key user feature even with higher power demand.

Embodiments disclosed herein include a dock capable of receiving power from an AC adapter and supplying power at any of a plurality of voltages. To prevent the dock from supplying power at an unwanted or unexpected voltage and damaging the information handling system, embodiments communicate with the AC adapter to determine if the power adapter is capable of providing power at other voltages, determine what other voltages are possible and establish a power supply contract to receive power at a second voltage. Embodiments also reset the dock to prevent accidentally supplying power to an information handling system at a voltage that could damage the information handling system.

Figure 1B:
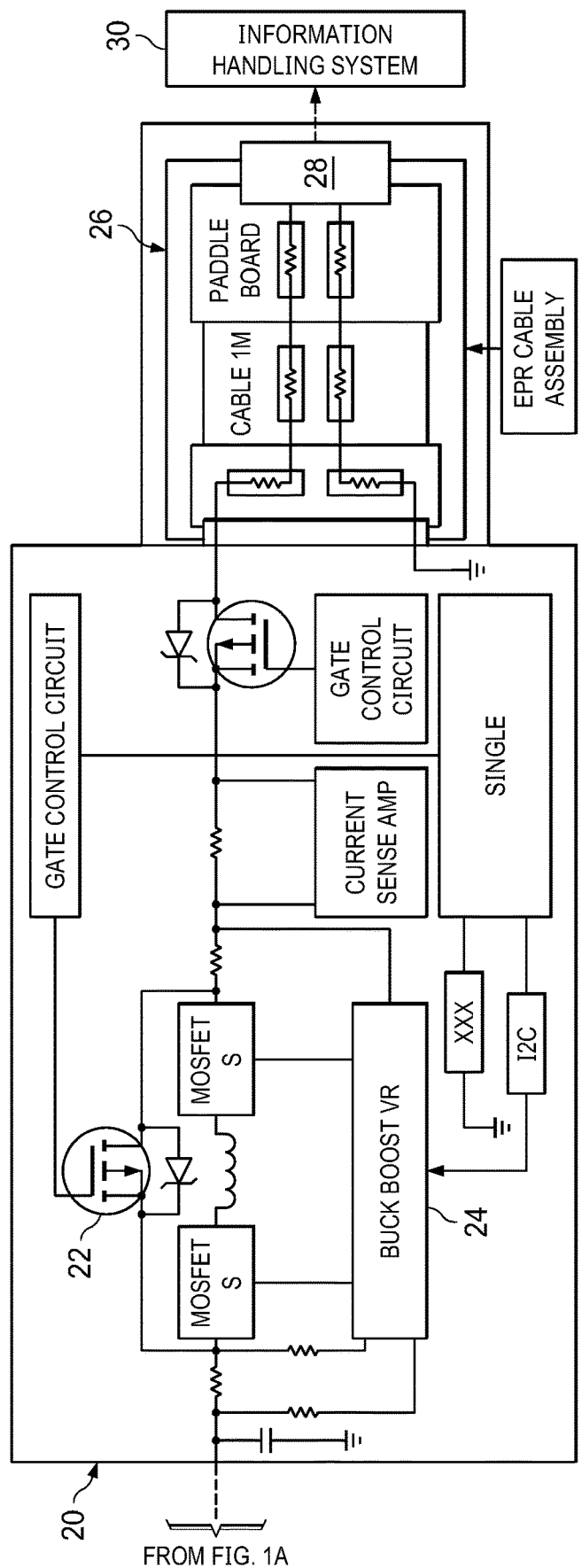

FIGS. 1A and 1B depict portions of a view of dock 100 for connecting to AC adapter 12 for receiving AC power and configured for supplying power to information handling system 30.

Referring to FIG. 1A, dock 100 comprises input module 10 configured to receive AC power from AC adapter 12 using barrel connector 14, wherein embedded controller (EC) 18 configured to communicate with AC adapter 12 through interface switching device 16

Referring to FIG. 1B, dock 100 further comprises converter 20 with bypass circuit 22 and buck boost 24 and connection 28 for coupling dock 100 to information handling systems 30 of different types. Converter 20 is configured to receive power from input module 10 at any of a plurality of voltages (e.g., 5-48 Volts) and supply the power to information handling system 30. Converter 20 comprises bypass circuit 22 and buck boost 24. Bypass circuit 22 allows power to bypass buck boost 24. Buck boost 24 may be used to step down or step up power to a voltage other than the first voltage.

Figure 2:
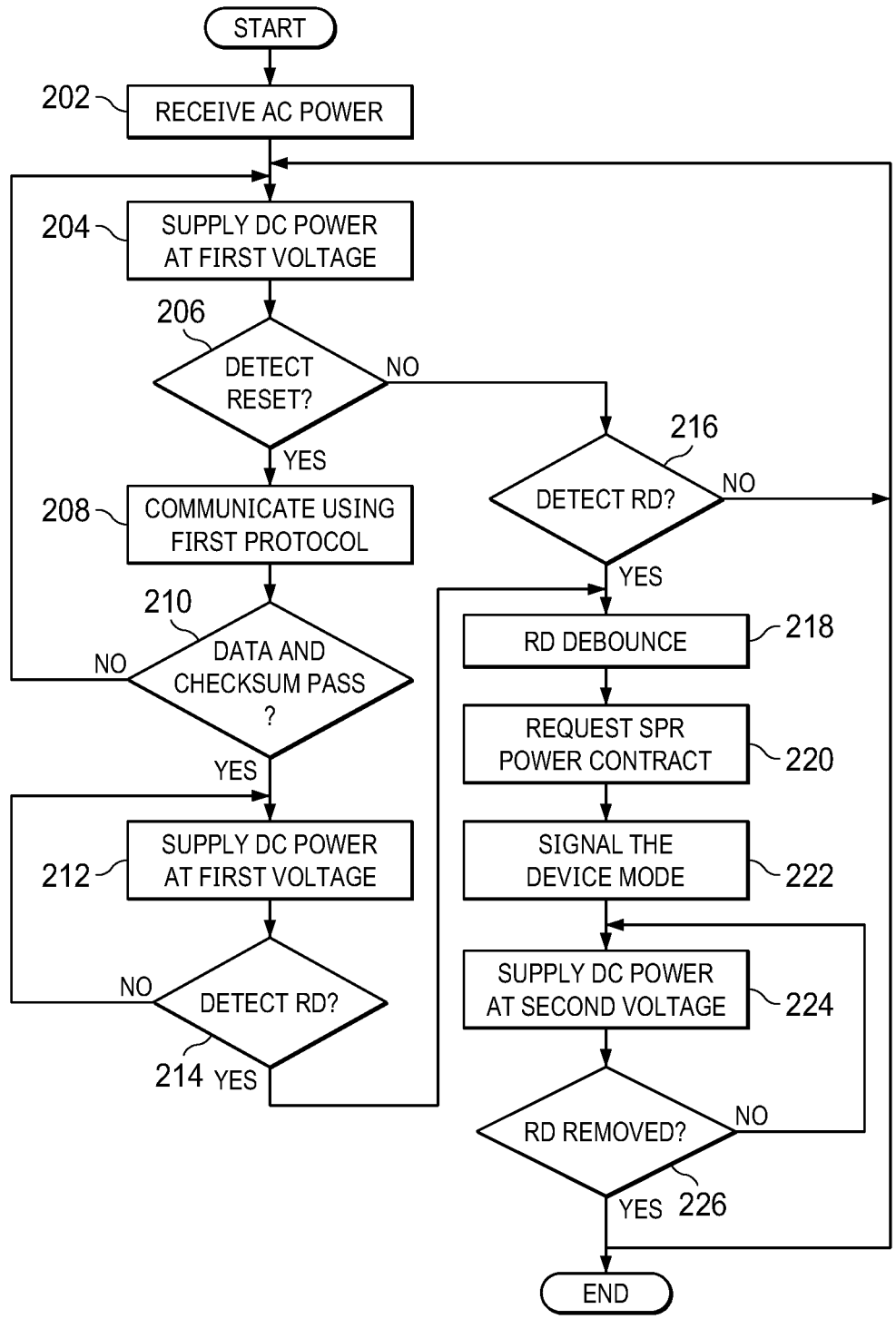
FIG. 2 depicts a flow diagram of a method for supplying power to an information handling system at any voltage of a plurality of voltages.

FIG. 2 depicts a flow diagram 200 of a method for supplying power to information handling system 30 at a voltage selected from a plurality of voltages using barrel connector 14.

At step 202, dock 100 receives AC adapter power via barrel connector 14. Barrel connector 14 may be a standard barrel connector capable of receiving power at any voltage of a plurality of voltages (e.g., 19.5 V, 22 V, 48 V).

At step 204, dock 100 is configured to supply power to information handling system 30 at the first voltage (e.g. 19.5 V). When AC adapter 12 is connected, EC 18 may communicate with AC adapter 12 to determine information about AC adapter 12. In response, AC adapter 12 may send a power supply identification (PS_ID) signal over a 1-wire interface that EC 18 uses to identify AC adapter 12. AC adapter 12 may communicate the PS_ID information over a 1-wire interface using a basic 1-wire communication protocol such as SDQ. EC 18 uses the PS_ID information to determine the type and capabilities of AC adapter 12.

At step 206, embodiments detect if there is a signal to reset dock 100 to a configuration for supplying power to information handling system 30 at a first voltage. The PS_ID information may be used as a signal to reset dock 100.

If embodiments determine at step 206 that a signal to reset dock 100 is received, then at step 208, EC 18 communicates with AC adapter 12 using a first 1-wire communication protocol (e.g., SDQ).

If dock 100 is being reset, then at step 210, embodiments ensure power supplied by AC adapter 12 is at a voltage that does not damage information handling system 30 by performing data and checksum checks.

If the data and checksum do not pass, embodiments may repeat steps 204-210 to ensure the data and checksum pass before supplying any power to information handling system 30.

If the data and checksum pass, then at step 212, dock 100 supplies power to information handling system 30 at the first voltage as a standard output (e.g., 19.5 V).

Figure 3:
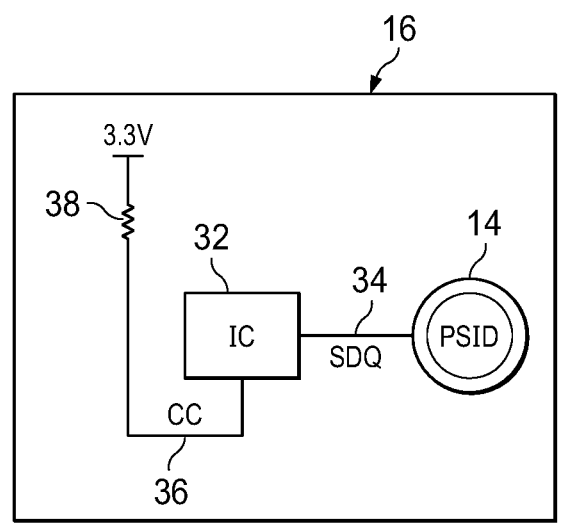
FIG. 3 depicts a diagram of a device for switching communication between a first protocol and a second protocol in a dock.

Embodiments may determine that power received at a second voltage may be preferred. To switch operations to receiving power at a second voltage, dock 100 performs steps to negotiate a power supply contract. As part of this step, embodiments attempt to switch to a next level of communication using a second 1-wire interface with a second 1-wire communication protocol. Turning briefly to FIG. 3, interface switching device 16 may include first 1-wire interface 34 for communicating using a first protocol (e.g., SDQ) and second 1-wire interface 36 for communicating using a second protocol (e.g., CC). A voltage drop caused by device resistor (Rd) 38 may determine which 1-wire interface is used. For example, when resistor 38 is not connected (removed), EC 18 communicates using the first 1-wire interface 34 and when resistor 38 is connected, EC 18 may communicate using the second 1-wire interface 36.

Referring again to FIG. 2, at step 214, embodiments determine if device resistor (Rd) 38 is connected, such as by detecting a voltage drop. If there is no voltage drop, EC 18 may repeat steps 212 and 214 to verify resistor 38 is not connected or detect when resistor 38 is connected.

If EC 18 determines a signal to reset dock 100 is received (at step 206) or determines resistor 38 is removed (at step 214), dock 100 may continue to receive power and supply power to information handling system 30 at the first voltage.

If EC 18 determines a signal to reset dock is not received (at step 206) and determines resistor 38 is connected (at step 216), then EC attempts to establish a power supply contract.

At step 218, EC 18 sets a debounce time to prevent repeated voltage drops across resistor 38.

At step 218, EC 18 communicates a signal to AC adapter 12 to request a SPR (Standard Power Range) power contract. The signal may be a series of pulses.

At step 220, EC 18 communicates a signal to AC adapter 12 to request dock 100 operating in a desired device mode. A device mode may correspond with dock 100 operating in, for example, a power device (PD) Extended Power Range (EPR) mode. The device mode may be selected based on the second voltage.

Once a power supply contract has been negotiated and dock 100 is configured to operate in a selected device mode, at step 222, EC 18 communicates a signal to operate in the selected device mode to supply power at a second voltage (e.g., 48V). Dock 100 may be configured such that power is transmitted through buck boost 24 to increase or decrease voltage as needed for other components of dock 100.

Dock 100 continues to supply power at the second voltage until power is removed, such as by a user turning off information handling system 30 or disconnecting AC adapter 12. At step 224, EC 18 determines if resistor 38 is removed. If resistor 38 is not removed, then step 224 is repeated to ensure dock 100 does not stay in a configuration to supply power at the second voltage when dock 100 is disconnected from information handling system 30.

When resistor 38 is removed, embodiments perform steps to reset dock 100. In some embodiments, embodiments perform checks when information handling system 30 is powered down. For example, if a signal is received indicating resistor 38 is removed, embodiments may perform step 216 to verify resistor 38 is removed.

FIG. 3 depicts a view of interface switching device 16 configured to switch communication between a first 1-wire interface for basic communication with all AC adapters 12 (including legacy adapters) and a second 1-wire interface for more advanced communications with advanced AC adapters 12 (which may be capable of providing power at any of two or more voltages). When resistor 38 is removed (not connected) AC adapter 12 communicates with EC 18 over line 34 using a first protocol (e.g., SDQ). If resistor 38 is connected, AD adapter 12 may communicate with EC 18 over line 36 using a second protocol. In some embodiments, USB PD IC 32 causes or detects a voltage drop and signals EC 18. The first 1-wire interface uses a first protocol to communicate initially with all AC adapters 12 (including legacy AC adapters that are only capable of providing a single, fixed voltage (e.g., 19.5 V)). The second 1-wire interface uses a second protocol to communicate with advanced AC adapters 12 (including hybrid and other adapters 12 that are capable of providing a voltage selected from a plurality of voltages (e.g., 5, 9, 15, 20, 28, 36 and 48 Volts)).

Figure 4:
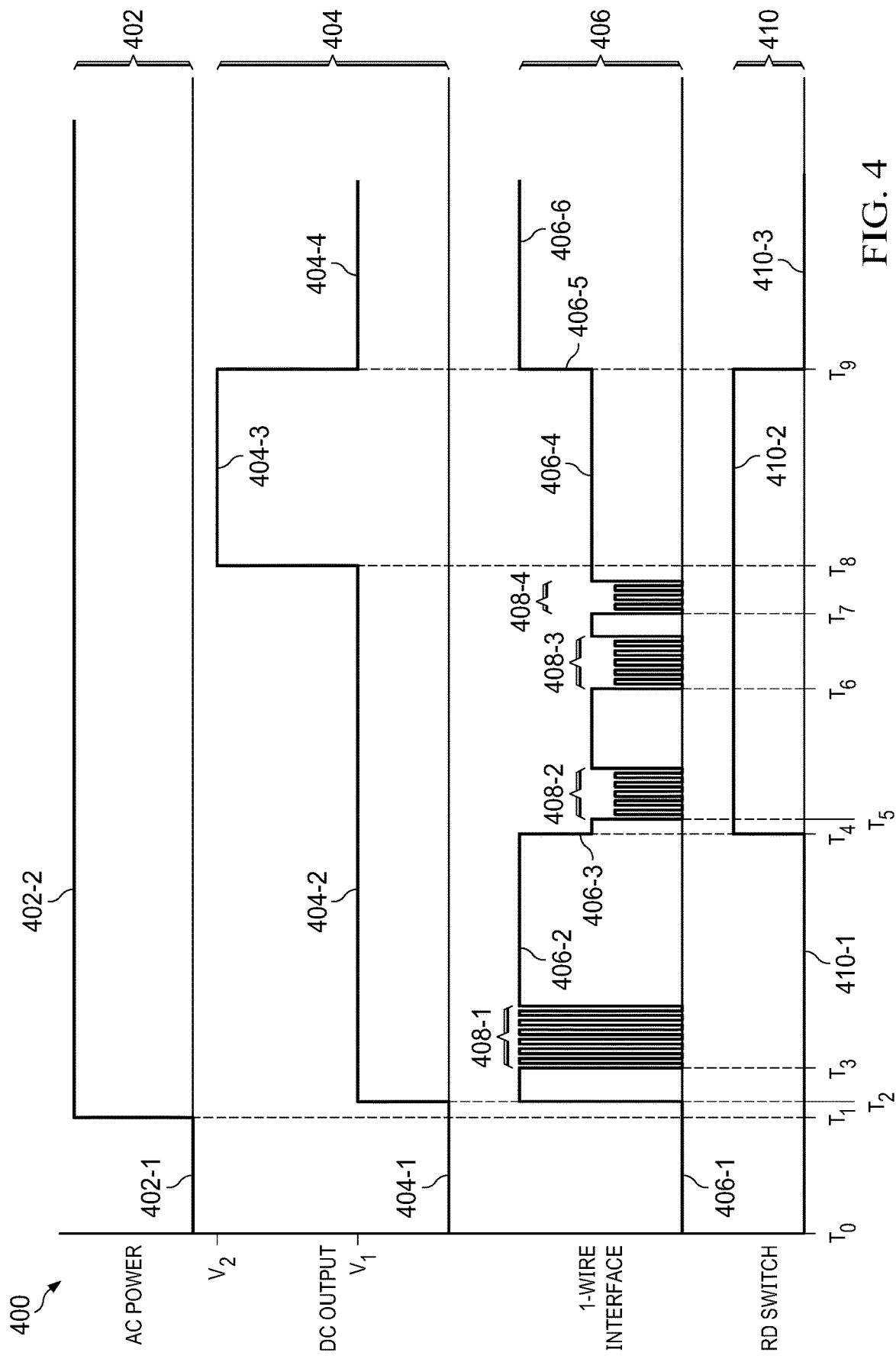
FIG. 4 depicts a diagram illustrating a sequence of steps of a method for supplying power to an information handling system at any voltage of a plurality of voltages.

FIG. 4 depicts a diagram illustrating timing of steps in a method for dock 100 to receive AC power, initially supply power at a first voltage and switch to supply power at a second voltage.

Referring to diagram 400, AC power line 402 depicts AC power supplied to dock 100 by AC adapter 12, DC output line 404 depicts power supplied by dock 100 to information handling system 30, PD PSID device line 406 depicts signals communicated using a first protocol (e.g., PSID) or a second protocol (e.g., CC), discussed in greater detail below, and resistor switch line 410 depicts resistor switch signals, also discussed in greater detail below.

At time $T_0$, no AC power is supplied to dock 100. Segment 402-1 represents AC power supplied from time $T_0$ until time $T_1$, illustrating no AC power is supplied before time $T_1$.

Dock Receives AC Power at a First Voltage

At time $T_1$, AC power is supplied to dock 100 (e.g., AC adapter 12 is connected to AC adapter 14 and an AC power source). Segment 402-2 depicts AC power is supplied after time $T_1$, wherein the AC power is supplied at a first voltage.

Dock Supplies Power at the First Voltage

At time $T_2$, dock 100 supplies power to information handling system 30 through connector 28 at a first voltage ($V_1$). Segment 404-2 depicts power is supplied starting at time $T_2$, illustrating dock 100 supplies power at the first voltage once it receives AC power.

Dock Communicates with the AC Adapter Over a First 1-Wire Interface

At time $T_3$, PD PSID device 16 sends signal 408-1 requesting PS_ID information about AC adapter 12. Segment 408-1 of PD PSID device 406 depicts a plurality of pulses in a format indicating interface switching device 16 is requesting Power Supply IDentification (PS_ID) information to initiate communication with AC adapter 12. If interface switching device 16 does not receive a response by time $T_4$, dock 100 continues to receive the AC power at the first voltage and supply power to information handling system 30 at the first voltage.

Dock Requests Power at a Second Voltage

At time $T_4$, if dock 100 receives PS_ID information, identifies AC adapter and determines AC adapter 12 may be capable of providing AC power at other voltages, EC 18 may begin negotiating a power supply contract for the second voltage.

Dock Switches to Second 1-Wire Interface

Part of negotiating a power supply contract may include EC 18 communicating with AC adapter over second 1-wire interface 36. Referring to FIG. 3, interface switching device 16 configured with resistor 38 may initiate a voltage drop (e.g., 3.3 Volts). When the voltage drop occurs, a corresponding jump in resistor switch voltage occurs (depicted by segment 410-2). As long as the resistor switch voltage is present, communication between EC 18 and AC adapter 12 occurs over second 1-wire interface 36.

At time $T_5$, EC 18 communicates a signal 408-2 requesting a power supply contract. The signal may be a defined series of pulses with a subsequent time period to allow AC adapter 12 to respond.

At time $T_6$, EC 18 communicates a signal 408-3 indicating a device mode that dock 100 will be operating in based on the second voltage. The signal may be a defined series of pulses with a subsequent time period to allow AC adapter 12 to respond.

At time $T_7$, after the power supply contract has been established, EC 18 communicates a signal 408-4 requesting the voltage change.

Signals 408 may be constructed to prevent variations in signal quality from being misinterpreted as a request to switch to a higher voltage. In some embodiments, each signal 408 comprises a plurality of pulses selected to ensure IC 16 and AC adapter 12 do not accidentally request or supply power at an incorrect voltage.

At time $T_8$, dock 100 begins supplying power to information handling system 30 at the second voltage (e.g., 48V).

If, at time $T_9$, the resistor switch voltage drops (depicted by segment 410-3), the voltage in interface switching device 16 increases (depicted by segments 406-5 and 406-6), causing interface switching device 16 to switch communications from the second 1-wire interface 36 back to the first 1-wire interface 34 and power is supplied at the first voltage (depicted by segment 404-4). Ensuring dock 100 resets to supplying power at the first voltage and communication is over the first 1-wire interface 34 using the first 1-wire communication protocol prevents power at the second voltage from inadvertently being supplied to an information handling system that can only handle the first voltage.

Dock 100 may be capable of performing steps by operating on a stored amount of power, such as in a capacitor. Thus, if a user suddenly unplugs information handling system 30 from dock 100 or unplugs dock 100 from AC adapter 12, dock may perform steps needed to reset dock 100 back to supplying power at the first voltage when AC power is supplied again.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for supplying power to an information handling system at a voltage selected from a plurality of voltages, the method comprising:
   receiving power from an alternating current (AC) adapter at a first voltage;
   supplying power to an information handling system at the first voltage;
   determining the AC adapter is capable of supplying power at a second voltage, including:
      communicating with the AC adapter to get the power supply identification (PSID) information is performed over a first 1-wire interface using a first protocol; and
      communicating with the AC adapter to determine one or more voltages the AC adapter is capable of providing is performed over a second 1-wire interface using a second protocol; and
      initiating a voltage drop as a signal to switch between the first 1-wire interface and the second 1-wire interface;
   establishing a power supply contract with the AC adapter to supply the power at the second voltage;
   configuring a dock to operate in a device mode based on the power supply contract; and
   communicating with the AC adapter to supply the power at the second voltage.

2. The method of claim 1, wherein the first 1-wire interface is associated with a PSID pin.

3. The method of claim 1, wherein the first protocol is an SDQ protocol.

4. The method of claim 1, wherein establishing a power supply contract with the AC adapter to supply the power at the second voltage comprises:

signaling the AC adapter a request for a power supply contract;

signaling a request to operate in a device mode based on the second voltage; and signaling a request to receive the power at the second voltage.

5. The method of claim 1, wherein the second voltage is selected based on an operating efficiency of the information handling system.

6. A dock for supplying power to an information handling system at a voltage selected from a plurality of voltages, the system comprising:

a barrel connector for receiving power at a first voltage;

a device capable of switching between a first 1-wire interface and a second 1-wire interface;

an embedded controller (EC) comprising a memory storing a set of instructions that, when executed by the EC, cause the EC to:

communicate with an alternating current (AC) adapter using the first 1-wire interface to receive information for the AC adapter;

determine, from the information received from the AC adapter, that the AC adapter is capable of supplying power at a second voltage, including:

communicate with the AC adapter to get the power supply identification (PSID) information is performed over a first 1-wire interface using a first protocol; and communicate with the AC adapter to determine one or more voltages the AC adapter is capable of providing is performed over a second 1-wire interface using a second protocol; and initiate a voltage drop as a signal to switch between the first 1-wire interface and the second 1-wire interface;

communicate with the AC adapter using the second 1-wire interface to establish a power supply contract with the AC adapter to supply the power at the second voltage of the plurality of voltages;

configure the dock to operate in a device mode based on the power supply contract; and communicate with the AC adapter using the second 1-wire interface to supply the power at the second voltage of the plurality of voltages.

7. The dock of claim 6, wherein the first protocol is an SDQ protocol.

8. The dock of claim 6, wherein the first 1-wire interface comprises a PSID pin.

9. The dock of claim 6, wherein the set of instructions, when executed by the EC, cause the EC to:

signal the AC adapter a request for a power supply contract;

signal a request to operate in a device mode based on the second Voltage; and signal a request to receive the power at the second voltage.

10. The dock of claim 6, wherein the set of instructions, when executed by the EC, cause the EC to select the second voltage based on an operating efficiency of the information handling system.

* * * * *